UNITED STATES PATENT OFFICE 2,132,822

MANUFACTURE OF GELATIN

John Vernon Stuart Glass, Sutton Weaver, near Warrington, and Benjamin Woolf Hirsh, Runcorn, England, assignors to Imperial Chemical Industries Limited, a corporation of Great Britain No Drawing. Application August 10, 1936, Serial No. 95,282. In Great Britain September 27, 1935

9 Claims. (Cl. 87—7)

This invention relates to improvements in the manufacture of gelatin and glue, and more particularly to a method of improving the clarity thereof.

In the preparation of solutions of gelatin or glue from osseine, skin, and similar sources, a small amount of the make may contain material which impairs its clarity and which cannot be filtered out by normal methods. A known method by which such turbid solutions may be clarified comprises treatment with aluminium sulphate followed by phosphoric acid. While treatment in this way can be made to given clear solutions without greatly impairing the jelly strength, it has been found that very close control of the conditions is required in order to obtain optimum results with respect to clarity, colour and jelly strength.

According to the present invention, the colour and clarity of a turbid solution of glue or gelatin are improved by treating the solution at an elevated temperature with a water soluble aluminate, e. g. sodium aluminate, under such conditions that the pH of the solution attains a value of at least 8.5 and preferably not more than 10.0 on the addition of the whole of the aluminate, separating the precipitate, and then working up the solution in known manner.

The improvement in the colour and clarity of the solutions attained by this process is considerable, and is not accompanied by any notable loss of jelly strength.

The concentration of solution which may be used is not critical, but we have found that in solutions containing more than about 8% gelatin or glue, difficulties arise in settling out the precipitate. Preferably we use concentrations of from 3–6% and perform the clarification at temperatures of about 75–100° C.

The amount of aluminate necessary for clarification naturally depends to some extent on the grade of material submitted to treatment, but it should be borne in mind that addition of the reagent to the solution increases its alkalinity and we find that with increasing pH the "jelly strength" decreases under the conditions of treatment. When the pH exceeds 10.0 and there is the unfavourable combination of elevated temperature with an extended period of time for settling, this decrease becomes considerable. It is desirable not to add so much aluminate that a pH of about 9.0 is exceeded and to add it slowly with continued stirring in order that disadvantageous conditions shall not prevail locally or temporarily. It will be apparent that the amount which may be added before this value of the pH is attained will vary with the initial pH of the gelatin or glue solution, and if the initial pH is too great it will not be possible to add sufficient aluminate to complete the treatment before the excessive value of the pH is exceeded; on the other hand, if the initial pH is too small (i. e. if the solution is too acid) an unnecessarily large amount of aluminate will be required to bring the final value of the pH above 8.5 and in order that neither of these circumstances may arise, small amounts of acid, e. g. hydrochloric acid or phosphoric acid, or of an alkali such as caustic soda may also be added immediately before or during the gradual addition of the aluminate.

In a preferred form of our invention, therefore, the pH of the gelatin or glue solution is adjusted, where necessary, to between 5 and 6 before treatment with the aluminate by adding acid or alkali as the case may be, and then adding sufficient aluminate to bring the final pH of the solution within the prescribed limits. For this purpose solid aluminate amounting to 1.0 to 3.0% of the dry weight of the gelatin or glue is sufficient.

The addition of the solid aluminate in the manner described above, normally produces a coagulation of the turbid matter into an easily filterable form in a few minutes, and separation is complete after about half an hour; the clear solution may then be decanted off and/or filtered, preferably after neutralization with hydrochloric or other acid, and the preparation of the gelatin or glue completed in known manner.

Example I 700 gallons of a 4% turbid gelatin solution were brought to a pH of 6.0 by addition of hydrochloric acid, and then 7 lbs. of sodium aluminate were slowly stirred in at 100° C., the pH after the addition of the whole of the aluminate being above 8.5 but below 9.5. Coagulation occurred in a few minutes, and after standing for an hour the liquor was brought to a pH of 7 with hydrochloric acid and then allowed to settle. On running off and filtering it gave a glass clear filtrate with a pale yellow colour. The jelly strength of the clarified gelatin (measured with a plunger instrument) was 75% of that of the unclarified material.

Example II 1600 gallons of a 4.5% turbid gelatin solution were brought to a pH of 6.0 by addition of hydrochloric acid, and then 10 lbs. of sodium aluminate were slowly stirred in at 90° C., the pH after addition of the whole of the aluminate being above 8.5 but below 9.5. Coagulation occurred in a few minutes, and after standing for an hour the liquor was brought to a pH of 7 with hydrochloric acid and then allowed to settle. On running off and filtering it gave a glass clear filtrate with a pale yellow colour. The jelly strength of the clarified gelatin (measured with a plunger instrument) was 90% of that of the unclarified material.

*Example III*

1000 gallons of a 4% solution of a turbid skin glue having a pH of 4.75 were stirred at 90° C. with 16 lbs. of sodium aluminate, the pH after all of the latter had been added being about 9.0. Coagulation was complete in a few minutes and after standing for an hour the liquor was brought to pH 6.0 with hydrochloric acid and allowed to settle. On filtering, a clear filtrate of yellowish colour was obtained, having a jelly strength of 77% of the unclarified solution.

Although in the above we have described the clarification by the addition of a solid aluminate, this restriction is not essential and satisfactory results can be obtained using a solution of the reagent. However, the solutions of the alkali aluminate are liable to hydrolyze unless free alkali is present, and for this reason the use of a solid material is to be preferred.

We claim:

1. Process for the manufacture of glues and gelatins of improved colour and clarity which comprises treating their solutions in water at an elevated temperature below 100° C. with a quantity of a water soluble aluminate sufficient to bring the pH value of the solution to at least 8.5 but preferably not above 10.0, and separating the precipitate.

2. Process as claimed in claim 1 in which the water soluble aluminate is sodium aluminate.

3. Process for the manufacture of glues and gelatins of improved colour and clarity which comprises treating a solution containing not substantially more than 8% of the colloid at a temperature of 75–100° C. with a quantity of a water soluble aluminate sufficient to bring the pH value of the solution to at least 8.5 but preferably not above 10.0, and separating the precipitate.

4. Process according to claim 3 in which the water soluble aluminate is sodium aluminate.

5. Process according to claim 3 in which the solution undergoing treatment contains from 3–6% of colloid.

6. Process for the manufacture of glues and gelatins of improved colour and clarity which consists in treating at an elevated temperature below 100° C. a solution of the colloid of which the pH, is initially between 5 and 6 with a quantity of a water soluble aluminate sufficient to bring the pH value to at least 8.5 and thereafter separating the clear solution from the coagulated matter by filtering the same.

7. Process according to claim 6 in which the water soluble aluminate is sodium aluminate.

8. Process according to claim 6 in which the working temperature is 75–100° C.

9. The process which comprises adjusting the pH of a gelatin solution to 5 to 6, treating said solution at a temperature between 75° and 100° C. with a water soluble aluminate in an amount sufficient to adjust the pH to 8.5 to 10, neutralizing the solution with a mineral acid and decanting the clear solution from coagulated matter.

JOHN VERNON STUART GLASS.
BENJAMIN WOOLF HIRSH.